US008200836B2

(12) United States Patent
Chkodrov et al.

(10) Patent No.: US 8,200,836 B2
(45) Date of Patent: Jun. 12, 2012

(54) DURABLE EXACTLY ONCE MESSAGE DELIVERY AT SCALE

(75) Inventors: Gueorgui Chkodrov, Redmond, WA (US); Richard D. Hill, Kirkland, WA (US); Craig A. Critchley, Fall City, WA (US); Krishnan Srinivasan, AndraPradesh (IN); Tihomir Tarnavski, Redmond, WA (US); Mitchell G. Morris, Sammamish, WA (US); Pramod Gurunath, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 926 days.

(21) Appl. No.: 12/240,568

(22) Filed: Sep. 29, 2008

(65) Prior Publication Data

US 2009/0133039 A1 May 21, 2009

Related U.S. Application Data

(60) Provisional application No. 60/988,735, filed on Nov. 16, 2007.

(51) Int. Cl.
| | |
|---|---|
| G06F 15/16 | (2006.01) |
| G06F 15/167 | (2006.01) |
| G06F 15/177 | (2006.01) |
| G06F 15/173 | (2006.01) |
| G06F 3/00 | (2006.01) |
| G06F 9/44 | (2006.01) |
| G06F 9/46 | (2006.01) |
| G06F 13/00 | (2006.01) |

(52) U.S. Cl. ......... 709/230; 719/313; 719/314; 719/318

(58) Field of Classification Search .................... None
See application file for complete search history.

(56) References Cited

U.S. PATENT DOCUMENTS

| 5,377,350 A | 12/1994 | Skinner |
| 5,465,251 A | 11/1995 | Judd et al. |
| 5,786,771 A | 7/1998 | Feeney et al. |
| 5,819,272 A | 10/1998 | Benson |

(Continued)

FOREIGN PATENT DOCUMENTS

WO 9511560 4/1995

(Continued)

OTHER PUBLICATIONS

U.S. Appl. No. 12/263,878, Jan. 7, 2011, Notice of Allowance.

(Continued)

*Primary Examiner* — Andy Ho
*Assistant Examiner* — Craig Dorais
(74) *Attorney, Agent, or Firm* — Workman Nydegger (57) ABSTRACT

The present invention extends to methods, systems, and computer program products for durable exactly once message delivery at scale. A message capture system uses a synchronous capture channel and transactions to provide durable exactly once message capture. Messages are sent from the message capture system to a message delivery system over a network using an at least once transfer protocol. The message delivery system implements a durable at most once messaging behavior, the combination of which results in durable exactly once transfer of messages from the message capture system to the message delivery system. The message delivery system uses a synchronous delivery channel and transactions to provide durable exactly once message delivery. Cursors maintaining message consumer state are collocated with message consumers, freeing up message log resources to process increased volumes of messages, such as, for example, in a queued or pub/sub environment.

11 Claims, 6 Drawing Sheets

U.S. PATENT DOCUMENTS

| | | | |
|---|---|---|---|
| 5,826,269 | A | 10/1998 | Hussey |
| 5,870,556 | A | 2/1999 | Cote et al. |
| 5,872,930 | A | 2/1999 | Masters et al. |
| 5,951,648 | A | 9/1999 | Kailash |
| 5,951,695 | A | 9/1999 | Kolovson |
| 6,058,389 | A | 5/2000 | Chandra et al. |
| 6,205,498 | B1 | 3/2001 | Habusha et al. |
| 6,230,156 | B1 | 5/2001 | Hussey |
| 6,256,634 | B1 | 7/2001 | Moshaiov et al. |
| 6,336,135 | B1 | 1/2002 | Niblett |
| 6,339,794 | B2 | 1/2002 | Bolosky et al. |
| 6,446,144 | B1 | 9/2002 | Habusha et al. |
| 6,446,206 | B1 | 9/2002 | Feldbaum |
| 6,466,987 | B2 | 10/2002 | Bolosky et al. |
| 6,772,216 | B1 | 8/2004 | Ankireddipally et al. |
| 6,816,458 | B1 | 11/2004 | Kroon |
| 6,877,107 | B2 | 4/2005 | Giotta et al. |
| 6,970,945 | B1 | 11/2005 | Berkman et al. |
| 6,980,518 | B1 | 12/2005 | Sun et al. |
| 7,020,697 | B1 | 3/2006 | Goodman et al. |
| 7,050,432 | B1 | 5/2006 | Banavar et al. |
| 7,162,512 | B1 | 1/2007 | Amit et al. |
| 7,162,524 | B2 | 1/2007 | Astley et al. |
| 7,181,482 | B2 | 2/2007 | Jain et al. |
| 7,203,706 | B2 | 4/2007 | Jain et al. |
| 7,219,262 | B2 * | 5/2007 | Miller et al. ............... 714/15 |
| 7,254,616 | B1 | 8/2007 | Ennis et al. |
| 7,287,066 | B2 | 10/2007 | Ruggaber et al. |
| 7,525,964 | B2 | 4/2009 | Astley |
| 7,536,436 | B2 | 5/2009 | Kakivaya |
| 7,536,587 | B2 | 5/2009 | Vertes |
| 7,631,214 | B2 | 12/2009 | Bockhold |
| 7,668,961 | B2 * | 2/2010 | Lomet ................ 709/230 |
| 7,941,808 | B2 * | 5/2011 | Nikolov et al. .......... 719/316 |
| 8,055,711 | B2 * | 11/2011 | Fachan et al. .......... 709/205 |
| 2001/0032232 | A1 | 10/2001 | Zombek et al. |
| 2002/0004812 | A1 | 1/2002 | Motoyama |
| 2002/0123966 | A1 | 9/2002 | Chu |
| 2003/0005117 | A1 | 1/2003 | Kang et al. |
| 2003/0023737 | A1 * | 1/2003 | Johnson et al. .......... 709/230 |
| 2003/0110314 | A1 | 6/2003 | Barnes |
| 2004/0111652 | A1 | 6/2004 | Shoaib et al. |
| 2004/0136325 | A1 | 7/2004 | Dobric et al. |
| 2004/0139166 | A1 | 7/2004 | Collison |
| 2004/0205124 | A1 | 10/2004 | Limprecht et al. |
| 2004/0205781 | A1 | 10/2004 | Hill et al. |
| 2005/0021622 | A1 | 1/2005 | Cullen |
| 2005/0138112 | A1 | 6/2005 | Sagar et al. |
| 2005/0289414 | A1 | 12/2005 | Adya |
| 2006/0036679 | A1 | 2/2006 | Goodman et al. |
| 2006/0037069 | A1 | 2/2006 | Fisher |
| 2006/0080670 | A1 * | 4/2006 | Lomet ................ 719/314 |
| 2006/0136256 | A1 | 6/2006 | Roots et al. |
| 2006/0146991 | A1 | 7/2006 | Thompson et al. |
| 2006/0168052 | A1 | 7/2006 | Srinivasan |
| 2007/0156808 | A1 | 7/2007 | Koegel et al. |
| 2007/0174233 | A1 | 7/2007 | Ginis et al. |
| 2007/0245018 | A1 | 10/2007 | Bhola et al. |
| 2007/0266392 | A1 | 11/2007 | Thoelke |
| 2008/0209007 | A1 | 8/2008 | Gurecki |
| 2009/0064182 | A1 | 3/2009 | Holar |

FOREIGN PATENT DOCUMENTS

| | | |
|---|---|---|
| WO | 0041365 | 7/2000 |
| WO | 2009037685 A1 | 3/2009 |

OTHER PUBLICATIONS

U.S. Appl. No. 12/263,891, Jan. 25, 2011, Notice of Allowance.
Eugster, Patrick Th., et al., "The Many Faces of Publish/Subscribe", ACM Computing Surveys, vol. 35, No. 2, Jun. 2003, pp. 114-131.
Joshi, Rajive, Real-Time Innovations, Inc., Embedded.com, "Building a effective real-time distributed publish-subscribe framework Part 1", Aug. 2006, 6 pages.
Slama, Dirk, et al., "Service Oriented Architecture: Inventory of Distributed Computing Concepts", Dec. 2004, 5 pages.
Bhola, Sumeer, et al., "Exactly-Once Delivery in a Content-Based Publish-Subscrbe System", 2002, 10 pages.
Bhola, Sumeer, et al., "Scalably Supporting Durable Subscriptions in a Publish/Subscribe System", Proceedings of the 2003 International Conference on Dependable Systems and Networks (DSN '03), 2003 IEEE, 10 pages.
Datasheet, "Sun Java System Message Queue Enterprise Edition", 2003, 6 pages.
ORACLE9i Application Developer'S Guide—Fundamentals, Release 2 (9.2), Part No. A96590-01, "Using the Publish-Subscribe Model for Applications", 2002, 8 pages.
Corsaro, Angelo, et al., "Quality of Service in Publish/Subscribe Middleware", IOS Press 2006, 19 pages.
Eugster, Patrick, et al., "Distributed Asynchronous Collections: Abstractions for Publish/Subscribe Interaction", 2000, 33 pages.
Hu, Songlin, et al., "Client Mobility in Distributed Content-Based Publish/Subscribe Systems", MSRG Technical Report, University of Toronto, Nov. 2007, 12 pages.
U.S. Appl. No. 12/263,878, Sep. 24, 2010, Office Action.
Lazar, Sashi; Weerakoon, Ishan; and Sidhu, Deepinder; "A Scalable Location Tracking and Message Delivery Scheme for Mobile Agents," Procceedings Seventh IEEE International Workshops on Enabling Technologies: Infrastructure for Collaborative Enterprises (WET ICE '98), Jun. 17-19, 1998, pp. 243-248.
Brzezinski, Jerzy; Kobusinska, Anna; and Kobusinski, Jacek; "Reliable Services for Distributed Environment," Proceedings International Conference on Parallel and Distributed Processing Techniques and Applications, Jun. 26-29, 2000, vol. V, pp. 2667-2673.
Horrell, Simon; "Microsoft Message Queue (MSMQ)," Enterprise Middleware, Jun. 1999, pp. 25-35.
Al-Jaber, Hessa and Rotenstreich, Shmuel; The Cascade Fault Tolerance Message System,: Seventeenth Annual ACM Computer Science Conference, Feb. 21-23, 1989, pp. 252-259.
Kausar, Nadia and Crowcroft, Jon; "End to End Reliable Multicast Transport Protocol Requirements for Collaborative Multimedia Systems," Proceedings Seventeenth IEEE Symposium on Reliable Distributed Systems, Oct. 20-23, 1998, pp. 425-430.
Kung, Roberto and Shacham, Nachum; "A Distributed Algorithm for Reliable Message Delivery Over a Sub-Network," GLOBECOM'87 IEEE/IEICE Global Telecommunications Conference 1987, Nov. 15-18, 1987, vol. 1, pp. 193-198.
Tai, Stephen; Mikalsen, Thomas; Rouvellou, Isabelle; Sutton, Stanley M. Jr.; "Conditional Messaging: Extending Reliable Messaging with Application Conditions," Proceedings 22nd International Conference on Distributed Computing Systems, Jul. 2-5, 2002, pp. 123-132.
Al-Jaber, Hessa and Rotenstreich, Shmuel, "Reliable Message Delivery Without Hard Backups," International Journal of Mini and Microcomputers, 1992, vol. 14, No. 3, pp. 117-124.
Jim Gray & Andreas Reuter, Transaction Processing: Concepts and Techniques (Bruce M. Spatz ed., Morgan Kaufmann Publishers, Inc. 1993).
Bilorusets, Ruslan, et al. Web Services Reliable Messaging Protocol (WS-ReliableMessaging) BEA, IBM, Microsoft and TIBCO Software, Mar. 13, 2003.
IBM, "Method of enabling automated invocation of web services", Research Disclosure, Mason Publishing, Mar. 2002.
Office Action for U.S. Appl. No. 10/401,649 mailed Mar. 3, 2008.
Office Action for U.S. Appl. No. 10/401,649 mailed Aug. 11, 2008.
Zhao, Yuanyuan, et al., "Subscription Propagation in Highly-Available Publish/Subscribe Middleware", 2004, 20 pages.
Wikipedia, "Microsoft Message Queuing", 2009, 3 pages.
Orbix, "OrbixTalk MessageStore", 2002, 4 pages.
Johnson, Sender-Based Message Logging, 1987, 6 pages.
Office Action dated Dec. 8, 2008 cited in U.S. Appl. No. 10/401,649.
Notice of Allowance dated Jun. 11, 2009 cited in U.S. Appl. No. 10/401,649.
U.S. Appl. No. 10/401,649, Nov. 4, 2009, Notice of Allowance.

* cited by examiner

DURABLE EXACTLY ONCE MESSAGE DELIVERY AT SCALE

CROSS-REFERENCE TO RELATED APPLICATIONS

This application claims the benefit of U.S. Provisional Patent Application No. 60/988,735, entitled "STORAGE FOR DISTRIBUTED MESSAGE SYSTEMS", filed on Nov. 16, 2007, which is incorporated herein in its entirety.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Distributed messaging systems can implement queuing and publish/subscribe ("pub/sub") message patterns. A queue is essentially a one-to-one consumer message exchange. A message producer inserts a message into the queue and a message consumer takes the message out of the queue. On the other hand, a pub/sub system is a one-to-many message exchange. A message producer publishes a message and multiple message consumers subscribe to and receive the published message.

Distributed messaging systems, including those that implement queuing and pub/sub patterns, are typically backed by a message store. In these distributed messaging systems, the state of individual consumers who subscribe for messages from a topic or who consume from a queue is collocated with the message store. Consumers (e.g., user code applications) typically use distributed messaging systems to ensure that the message is delivered exactly once from the message log to the consumer. Consumers use distributed transactions, for example, implementing a transaction across a Wide Area Network, to retrieve messages because application state is inherently tied with the cursor state. Unfortunately, the use of collocated user state and message store and inter-network distributed transactions does not scale for large numbers of consumers receiving messages from a queue or topic for at least a number of different reasons.

Since user state is collocated with the message store, the resource capabilities of the message store limit the amount of user state that can be simultaneously maintained, which correspondingly limits the number applications that can simultaneously interact with the message store. Further, transactions are resource intensive operations, require participants to wait on other participants, and require computer systems to keep in-memory state (e.g., locks). Thus, the resources of the message store and/or communication medium can limit the number of simultaneous transactions that are possible for the message log. Further, implementing transactions across a network consumes a significant amount of bandwidth and can negatively impact other types of communication on the network.

BRIEF SUMMARY

The present invention extends to methods, systems, and computer program products for durable exactly once message delivery at scale. In some embodiments, a componentized message system provides end to end durable exactly once message delivery. The componentized messaging system includes a message sender and a sending component. The message sender and the sending component interoperate to implement a synchronous transaction based capture protocol for transferring messages from the message sender to the sending component. The synchronous transaction based capture protocol assures durable exactly once transfer of messages from the message sender to the sending component.

The componentized messaging system also includes a receiving component and a network. The sending component and the receiving component are connected to the network. The sending component and the receiving component interoperate to implement a transfer protocol for transferring message from the sending component to the receiving component. The transfer protocol assures at least once transfer of messages from the sending component to the receiving component. The receiving component is configured to keep durable state and discard duplicate messages resulting in an at most once behavior. Accordingly, the transfer protocol, in combination with the at most once behavior of the receiving component, results in durable exactly once transfer of messages from sending component to the receiving component.

The componentized messaging system also includes a message recipient. The receiving component and the message recipient interoperate to implement a synchronous transaction based delivery protocol for transferring messages from the receiving component to the message recipient. The synchronous transaction based delivery protocol assures durable exactly once transfer of messages from the receiving component to the message recipient.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for durable exactly once message delivery at scale. In some embodiments, a componentized message system provides end to end durable exactly once message delivery. The componentized messaging system includes a message sender and a sending component. The message sender and the sending component interoperate to implement a synchronous transaction based capture protocol for transferring messages from the message sender to the sending component. The synchronous transaction based capture protocol assures durable exactly once transfer of messages from the message sender to the sending component.

The componentized messaging system also includes a receiving component and a network. The sending component and the receiving component are connected to the network. The sending component and the receiving component interoperate to implement a transfer protocol for transferring message from the sending component to the receiving component. The transfer protocol assures at least once transfer of messages from the sending component to the receiving component. The receiving component is configured to keep durable state and discard duplicates resulting in an at most once behavior. Accordingly, the transfer protocol, in combination with the at most once behavior of the receiving component, results in durable exactly once transfer of messages from sending component to the receiving component.

The componentized messaging system also includes a message recipient. The receiving component and the message recipient interoperate to implement a synchronous transaction based delivery protocol for transferring messages from the receiving component to the message recipient. The synchronous transaction based delivery protocol assures durable exactly once transfer of messages from the receiving component to the message recipient.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transfer of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1A:
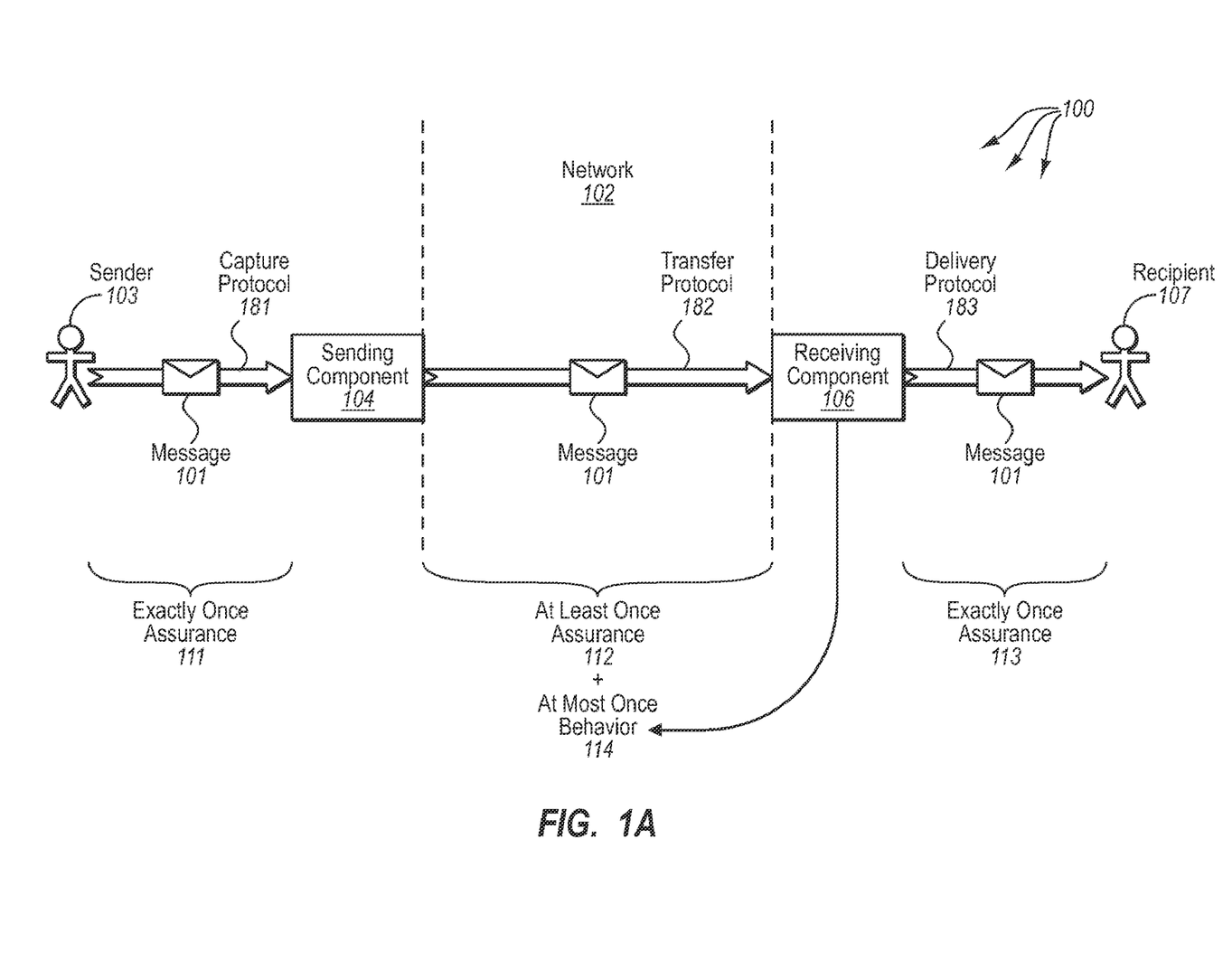
FIG. 1A illustrates an example computer architecture that facilitates durable exactly once message delivery at scale.

FIG. 1A illustrates an example computer architecture 100 that facilitates durable exactly once message delivery at scale. As depicted, computer architecture 100 includes sender 103, sending component 104, network 102, receiving component 106, and recipient 107. Each of the depicted computer systems can be connected to one another over (or be part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, sending component 104 (captures messages (e.g., message 101) from sender 103 (e.g., for delivery to message consumers). Sender 103 and sending component 104 can interoperate to implement a synchronous transaction based capture protocol 181 for transferring messages from the sender 103 to sending component 104. Synchronous transaction based capture protocol 181 assures durable exactly once transfer (e.g., providing exactly once assurance 111) of messages from the sender 103 to sending component 104.

A queue is essentially a one-to-one consumer message exchange. A message producer inserts a message into the queue and a message consumer takes the message out of the queue. On the other hand, a pub/sub system is a one-to-many message exchange. A message producer publishes a message and multiple message consumers subscribe to and receive the published message.

Sending component 104 and receiving component 106 are connected to network 102. Sending component 104 and receiving component 106 interoperate to implement transfer protocol 182 for transferring messages (e.g., message 101) from sending component 104 to receiving component 106. Transfer protocol 182 assures at least once transfer (e.g., providing at least once assurance 112) of messages from sending component 104 to receiving component 106. Receiving component 106 can be configured to keep durable state and discard duplicates resulting in at most once behavior 114. At least once assurance 112 in combination with the at most once behavoir 114 results in durable exactly once transfer of messages from sending component 104 to receiving component 106.

Within this specification and following claims "idempotence" is defined as a property of an operation which yields the same result whether the operation is performed once or more than once. At most once behavior 114 essentially results in the transfer or messages over network 102 being idempotent. That is, at most once behavior 114 assures that even if a message is transferred across network 102 multiple times, the resulting impact at receiving component 106 is the same as when the message is transferred across network 102 once. This results in idempotence at a receiving component for received messages.

Similarly, after a sending component receives an acknowledgment from a receiving component acknowledging receipt of one or more messages, the sending component disregards any further acknowledgements from the receiving component for the one or more messages. For example, if sending component 104 receives an acknowledgement of all messages with an ID of <20 (frrm receiving component 106), sending component 104 ignores a subsequently received acknowledgement of all messages <17 (from receiving component 106). Thus, a sending component can implement an at most once behavior for message acknowledgments. This results in idempotence at a sending component for received acknowledgments.

Generally, receiving component 106 delivers messages (e.g., message 101) to recipient 107 (e.g., a message consumer from a message queue or pub/sub environment). Receiving component 106 and recipient 107 can interoperate to implement a synchronous transaction based delivery protocol 183 for transferring messages (e.g., message 101) from receiving component 106 to recipient 107. Synchronous transaction based delivery protocol 183 assures durable exactly once transfer of messages from receiving component 106 to recipient 107.

In some embodiments, sender 103 and sending component 104 are collocated on computer system or local area network. Similarly in these embodiments, receiving component 106 and recipient 107 are collocated on a different computer system or local area network. Network 102 separates the computer systems and/or LANs from one another.

Figure 1B:
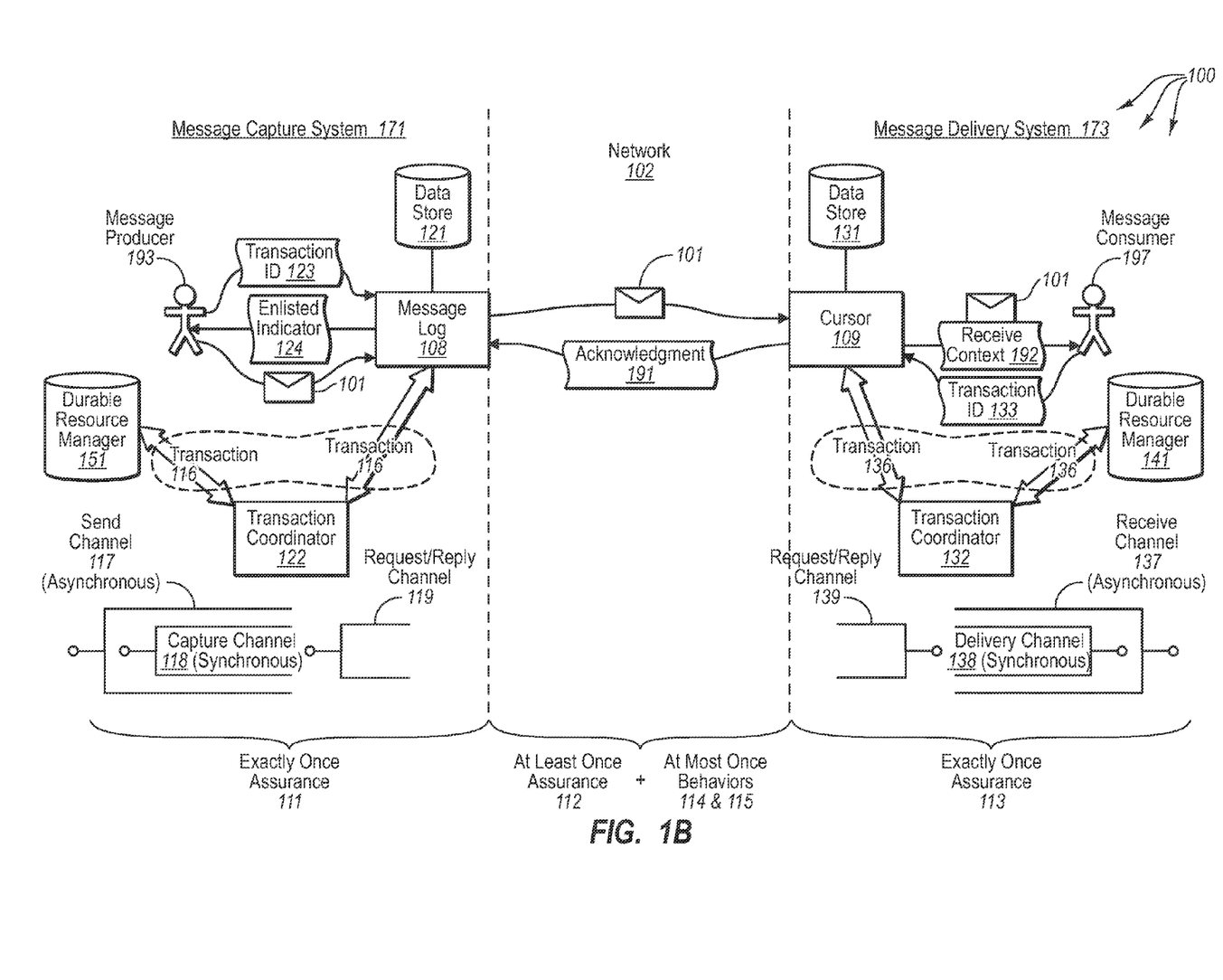
FIG. 1B illustrates another example computer architecture that facilitates durable exactly once message delivery at scale.

Capture protocol 181, transfer protocol 182, and delivery protocol 183 can be implemented in any of a variety of different ways. FIG. 1B illustrates another (more detailed) example of computer architecture 150 that facilitates durable exactly once message delivery at scale. Capture protocol 181, transfer protocol 182, and delivery protocol 183 can be implements using the components in FIG. 1B.

As depicted, computer architecture 100 includes message capture system 171, network 102, and message delivery system 173. Network 102 separates message capture system 171 from message delivery system 173.

Message capture system 171 can be configured to implement capture protocol 181. As depicted, message capture system 171 includes message producer 193, durable resource manager 151, transaction coordinator 122, message log 108 and data store 121. Message capture system 171 can provide durable exactly once capture of a message (e.g., exactly once assurance 111) using a synchronous capture channel and transactions.

Generally, message producer 193 sends messages (e.g., message 101) to message log 108. The messages are based on resources from durable resources manager 151. Message log 108 can invoke desired messaging behavior to store messages (with essentially no knowledge of potential message consumers) in data store 121.

Message producer 193 is configured to initiate transactions for transferring messages to message log 108. Message producer 193 can attach a transaction ID 123 to messages sent to message log 108. Message producer 193 can instruct durable resource manager 151 and message log 108 to contact transaction coordinator 122 to enlist in a transaction corresponding to transaction ID 123. The transaction can be for message log 108 capturing a message (e.g., message 101) from the durable resource manager 151 and state changes at durable resource manager 151 are completed atomically.

Message log 108 can synchronously receive transaction ID 123 from message producer 193. Thus, transaction coordinator 122 can coordinate transactions between message log 108 and durable resource manager 151. For example, message log 108 and durable resource manager 151 can enlist with transaction coordinator 122 in transaction 116 corresponding to transaction ID 123. Transaction 116 can be for message log 108 to capture a message (e.g., message 101) from durable resource manager 151 and to update state changes at durable resource manager 151. Transaction 116 facilitates atomic completion of message capture and state updates. Message log 108 can receive the message as a result of a transaction and store the message in data store 121 (durable storage). Upon completion of enlisting in transaction 116 with transaction coordinator 122 and inserting message 101 into data store 121, message log 108 returns enlistment indicator 124 to message producer 193.

Accordingly, a message producer can start a transaction, read data from a resource manager, and send a message containing the data and an attached transaction ID to a message log. The message log receives the message and attached transaction ID. The message log enlists in the transaction corresponding to the transaction ID (e.g., using a request/response to a transaction coordinator). The message log then responds to the message producer indicating its enlistment in the transaction. The producer's send operation unblocks and the transaction can commit or abort.

Message delivery system 173 can be configured to implement delivery protocol 183. As depicted, message delivery system 173 includes message consumer 197, durable resource manager 141, transaction coordinator 132, cursor 109 and data store 131. Message delivery system 173 can provide durable exactly once delivery of a message (e.g., exactly once assurance 113) using a synchronous delivery channel and transactions.

Generally, cursor 109 sends messages (e.g., message 101) to message consumer 197. Message consumer 197 initiates a transaction for processing the message. For example, message consumer 197 can modify data protected by durable resource manager 141 as a result of processing the message, store the message in durable resource manager 141, or perform other operations with message content.

Once message consumer 197 has received and processed the message, message consumer 197 can synchronously send a delete message to cursor 109. The delete message can include a LockID retrieved form the receive context 192 to identify the message and a transaction ID 133 indicating that cursor 109 is to participate in transaction 136. Message consumer 197 can also send transaction ID 133 to durable resource manager 141.

Thus, transaction coordinator 132 can coordinate transactions between cursor 109 and durable resource manager 141 to delete a message and make state changes to durable resource manager 141. Transactions can be for deleting a message and making state changes at durable resource manager 114. Transactions facilitate delete a message and make state changes atomically. Thus, cursor 109 is configured to participate in transactions for deleting messages (e.g., message 101) from volatile storage of cursor 109 and recording that the messages are deleted in data store 131. Cursor 109 can synchronously receive transaction ID 133 from message consumer 197. Cursor 109 can enlist in transaction 136 corresponding to transaction ID 133 at transaction coordinator 132. Cursor 109 can record in data store 131 that the message 101 has been deleted as a result of a transaction. Cursor 109 can also respond to message consumer 197 indicating enlistment in transaction ID 133. Message consumer 197 can instruct transaction coordinator 132 to complete the transaction.

Accordingly, a message consumer can receive a message and start a transaction for processing the message. When message processing is complete, the message consumer can update cursor durable state to indicate that the message is deleted. The message consumer can send a transaction ID and indication of the message that is to be deleted to a cursor. The cursor can locate the message that is to be deleted from the message indication. The cursor can enlist in the transaction based on the transaction ID (e.g., using a request/response to a transaction coordinator). The cursor can attempt to update durable state to indicate deletion of the message. The cursor returns an indication of the success of the update to the message consumer. In response to the indication of success, the consumer's delete operation unblocks and the transaction can commit or abort. If the cursor is successful, the message consumer commits the transaction. On the other hand, if the cursor is unsuccessful the message consumer aborts the transaction.

Within computer architecture 100, a transfer protocol provides at least once assurance 112 for messages transferred over network 102. Network 102 connects message log 108 and cursor 109. When appropriate, messages (e.g., message 101) are sent from message log 108 over network 102 to cursor 109 using the transfer protocol. Cursor 109 is configured to store durable state and delete duplicate messages to implement at most once behavior 114. As such, message log 108 and cursor 109 can be configured to participate in the transfer protocol across network 102 to transfer messages from message log 108 to cursor 109 with at least once assurance 112.

The transfer protocol can include cursor 109 retrieving a message by sequence number. For example, cursor 109 can request a next message from message log 108 over network 102. Message log 108 can reply to the request by sending the next message (e.g., message 101) to cursor 109 over network 102. Thus, message log 108 is essentially a passive collection of messages, message log 108 receives a request for a message (e.g., a specified sequence number) and returns the message. If the requested message is not yet available message log 108 may block the request until it does have the message.

Message log 108 may also start a timer for a returned message (e.g., coinciding with sending the message to cursor 109). Message log 108 can resend the message if message log 108 fails to receive an acknowledgment of the message receipt from cursor 109 prior to expiration of the timer. When cursor 109 successfully deletes a message, cursor 109 sends acknowledgement 191 to message log 108 acknowledging receipt of the message. Acknowledgment 191 can include an acknowledgment range (e.g., all messages with sequence ID less than 40) indicating to message store 108 that cursor 109 is unlikely to (or will never) request any messages in that acknowledgment range again. Acknowledgement ranges from multiple cursors can be cascaded together such that message log 109 is alleviated from counting sequence numbers for multiple cursors.

If acknowledgement 191 is sent from cursor 109 but not received at message log 108 prior to timer expiration, message log 108 can resend the message. Subsequently, upon receipt of acknowledgement 191, message log 108 can delete the message from data store 121 in response to the acknowledgement. Message log 108 can be configured to delete duplicate acknowledgments to implement at most once behavior 115.

If cursor 109 subsequently receives an additional copy of the same message (e.g., based on a message ID), cursor 109 discards the copy. For example, when a duplicate message is received there are at least three possibilities. One possibility is that the message is in cursor volatile memory and is locked for processing by a message consumer or is unlocked and available to be processed. Another possibility is that the message is known to have already been deleted through an express record for the message. For example, cursor 109 can maintain a record of message sequence numbers that were previously deleted. A further possibility is that the cursor knows through other records that the message will not be requested again. For example, cursor 109 can maintain a base sequence number indicating a contiguous range of messages that were already dealt with.

Accordingly, message producers view message log 108 as a well behaved participant in transactions. Cursor 109 views message log 108 as an unchanging collection of messages with idempotent behavior for acknowledgements. Message log 108 views cursor 109 as having idempotent behavior for messages. Message consumers view cursor 109 as a well behaved participant in transactions.

Figure 2A:
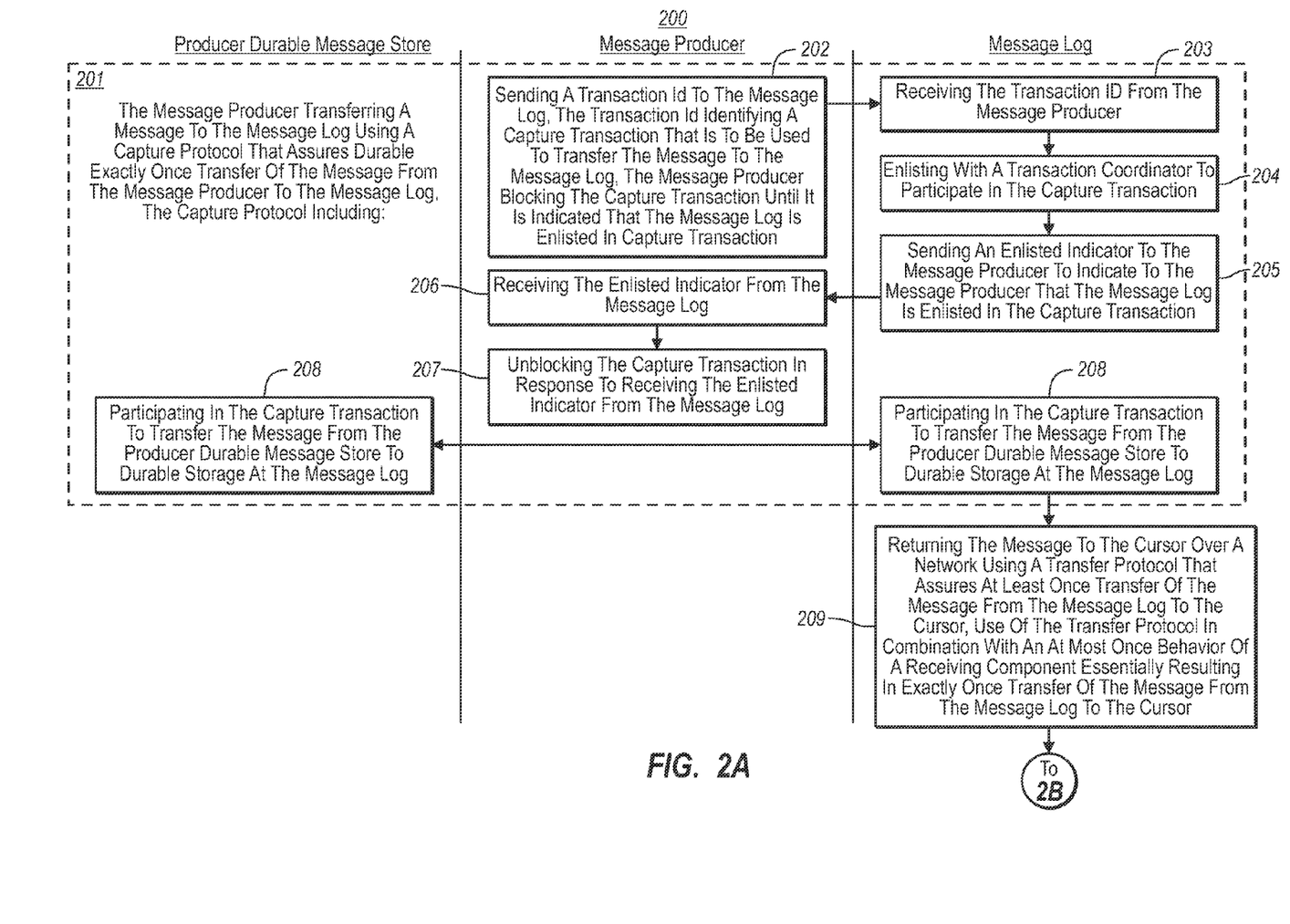
FIGS. 2A and 2B illustrate a flow chart of an example method for exactly once message delivery at scale.
Figure 2B:
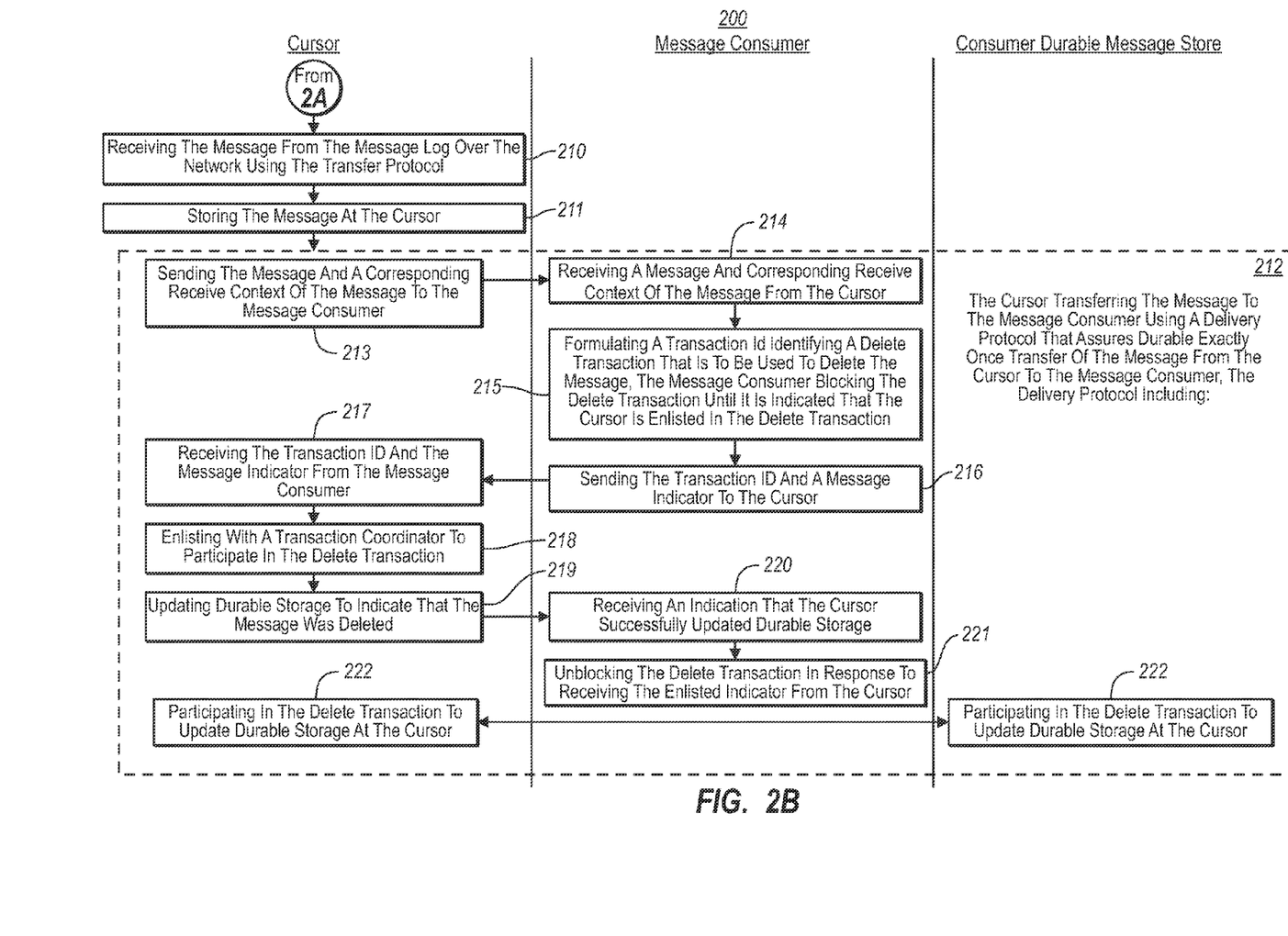

FIGS. 2A and 2B illustrate a flow chart of an example method 200 for exactly once message delivery at scale. Method 200 will be described with respect to the components and data of computer architecture 100.

Method 200 includes an act of a message producer transferring a message to a message log using a capture protocol that assures durable exactly once transfer of the message from the message producer to the message log (act 201). For example, message producer 193 can transfer message 101 to message log 108 using a capture protocol (e.g., capture protocol 181) that assures durable exactly once transfer of the message from message producer 193 to message log 108.

Method 200 can include message producer 193 initiating a transaction that is to include durable resource manager 151 and message log 108. For example, message producer 193 can execute code similar to:

```
using (TransactionScope scope=newTransactionScope)
{
    Message m=resourceManager.Read( );
    resoruceManager.Delete(m);
    channel. Send(m);
    scope.Complete( );
}
```

Method 200 includes an act of the message producer sending a transaction ID along with the message to the message log, the transaction ID identifying a capture transaction that is to be used to transfer the message to the message log, the message producer blocking the capture transaction from committing until it is indicated that the message log is enlisted in capture transaction (act 202). For example, message producer 193 can execute channel.send( ) to send transaction ID 123 to message log 108. Transaction ID 123 can identify transaction 116 that is to be used to transfer message 101 to message log 108.

Channel.send( ) can cause transaction ID 123 to be sent via send channel 117, an asynchronous channel. Send channel 117 can be a defined channel, such as, for example, IOutputChannel. Send channel 117 can be extended or modified to include capture channel 118, a synchronous channel. Capture channel 118 can utilize request/reply channel 119 and does not return until acknowledgement 124 (e.g., of enlistment in transaction 116) is received back from message log 108. Accordingly, send channel 117 does not return until an acknowledgement 124 is received as well. As a result, code blocks at channel.send( ) until message log 108 responds to receiving transaction ID 123. Advantageously, transaction 116 is blocked until message log 108 acknowledges enlistment in transaction 116.

Method 200 includes an act of the message log receiving the transaction ID from the message producer (act 203). For example, message log 108 can receive transaction ID 123 from message producer 193. Method 200 includes an act of the message log enlisting with a transaction coordinator to participate in the capture transaction (act 204). For example, message log 108 can enlist with transaction ID 123 to participate in transaction 116. Method 200 includes an act of the message log sending the response message (indicating enlistment) to the message producer to indicate to the message producer that the message log is enlisted in the capture transaction (act 205). For example, message log 108 can send enlisted indicator 124 (the response message) (via request/reply channel 119, capture channel 118, send channel 117) to message producer 193. Enlisted indicator 124 (the response message) indicates to message producer 193 that message log 108 is enlisted to transaction 116. The response message can be correlated to the transaction through the transaction ID attached to the request message.

Method 200 includes an act of the message producer receiving the enlisted indicator from the message log (act 206). For example, message producer 193 can receive enlisted indicator 124 from message log 108 (via request/reply channel 119, capture channel 118, send channel 117). Method 200 includes an act of the message producer unblocking the capture transaction in response to receiving the enlisted indicator from the message log (act 207). For example, message producer 193 can unblock transaction 116 in response to receiving enlisted indicator 124 from message log 108. Receiving enlisted indicator 124 causes channel.Send( ) to return and permits execution to continue at scope.Complete( ) and thus transaction 116 can also continue.

Method 200 includes an act the message log and the producer durable message store participating in the capture transaction to transfer the message from the producer durable message store to durable storage at the message log (act 208). For example, message log 108 and durable resource manager 151 can participate in transaction 116 to transfer message 101 from durable resource manager 151 to message log 108. Transaction 116 can be a two-phase commit, include atomic properties, etc. At the completion of transaction 116, message 101 is deleted from durable resource manager 151 and stored in data store 121.

Method 200 includes an act of the message log returning the message to the cursor over the network using a transfer protocol that assures at least once transfer of the message from the message log to the cursor, use of the transfer protocol in combination with an at most once behavior of the receiving component essentially resulting in exactly once transfer of the message from the message log to the cursor (act 209). For example, cursor 109 can request the next message (e.g., by sequence #) from message log 108. In response, message log 108 can return message 101 to cursor 109 over network 102.

Method 200 includes an act of the cursor receiving the message from the message log over the network using the transfer protocol (act 210). For example, cursor 109 can receive message 101 from message log 108 over network 102 using the transfer protocol with acknowledged receipt of messages. Method 200 includes an act of the cursor storing the message at the cursor (act 211). For example, cursor 109 can store message 101 in volatile memory.

Method 200 includes an act of the cursor transferring the message to the message consumer using a delivery protocol that assures durable exactly once transfer of the message from the cursor to the message consumer (act 212). For example, cursor 109 can transfer message 101 to message consumer 197 using a delivery protocol (e.g., delivery protocol 183) that assures durable exactly once transfer of the message from cursor 109 to message consumer 197.

Method 200 includes an act of the cursor sending the message and a corresponding receive context of the message to the message consumer (act 213). For example, cursor 109 can send message 101 with receive context 192 attached to message consumer 197. Alternately, message 101 can contain a LockID and the Channel API can be extended to have a Delete method that accepts LockID (e.g., Delete(LockID lock). Method 200 includes an act of the message consumer receiving the message and the corresponding receive context of the message from the cursor (act 214). For example, message consumer 197 can receive message 101 with receive context 192 attached from cursor 109.

Message consumer 197 can then perform any variety of operations on the data contained in message 101, including storing message 101 at durable resource manager 141 for later use. When message consumer 197 has completed its operations, message consumer 197 can indicate to cursor 109 that cursor 109 is to delete message 101. Message consumer 197 can use a transaction to pass this indication to cursor 109.

Thus, method 200 can include message consumer 197 initiating a transaction that is to include durable resource manager 141 and cursor 109. For example, message consumer 197 can execute code similar to:

```
Message m = channel.Receive( )
using (Transaction Scope scope=new TransactionScope( ))
{
    resourceManager.Write(m);
    if (m.context.Complete( ));
    {
        scope. Complete( );
    }
}
```

Method 200 includes an act of the message consumer formulating a transaction ID identifying a delete transaction that is to be used to delete the message at the cursor, the message consumer blocking the delivery transaction until it is indicated that the cursor is enlisted in the delete transaction (act 215). For example, message consumer 197 can formulate transaction ID 133. Transaction ID 133 identifies transaction 136 that is to be used to indicate to cursor 109 that message 101 has been processed and can now be deleted. For example, a transaction can be to perform operations on (e.g., transfer) message 101 to the message consumer 197, update durable resource manager 141, and essentially at the same time delete message 101 from volatile storage of cursor 109. Message consumer 197 blocks transaction until cursor 109 indicates is enlistment in transaction 136. Method 200 includes an act of the message consumer sending the transaction ID and message indicator to the cursor (act 216). For example, message consumer 197 can execute m.context.Complete( ) to send transaction ID 133 and a message indicator for message 101 to cursor 109. Transaction ID 133 can identify transaction 136 that is to be used to delete message 101.

m.context.Complete( ) can cause transaction ID 133 and the message indicator to be sent via received channel 137, an asynchronous channel. Receive channel 137 can be a defined channel, such as, for example, IInput Channel. Receive channel 137 can be extended or modified to include delivery channel 138, a synchronous channel. Delivery channel 138 can utilize request/reply channel 139 and does not return until an acknowledgement (e.g., of enlistment in transaction 136) is received back from cursor 109. Accordingly, receive channel 137 does not return until an acknowledgement is received as well. As a result, code blocks at m.context.Complete( ) until cursor 109 responds to receiving transaction ID 133. Advantageously, transaction 136 is blocked until cursor 109 acknowledges enlistment in transaction 136.

Method 200 includes an act of the cursor receiving the transaction ID and message indicator from the message consumer (act 217). For example, cursor 109 can receive transaction ID 133 and a message indicator for message 101 from message consumer 197. In some embodiments, cursor 108 receives a message similar to Delete {TxID, LockID} from a message consumer. TxID is the transaction ID 133 of the transaction that the cursor is to enlisted in. LockID is the ID of a message that was locked for processing by the consumer.

Thus, cursor 109 can use a transaction ID to enlist in a delete transaction for deleting a message identified by a LockID. However, other mechanisms for indicating messages that are to be deleted can also be used.

Method 200 includes an act of the cursor enlisting with a transaction coordinator to participate in the delivery transaction (act 218). For example, cursor 109 can enlist with transaction coordinator 132 to participate in transaction 136. From the perspective of message consumer 197, m.context.Complete( ) blocks while cursor 109 enlists. Method 200 includes an act of the cursor updating durable state to indicate that the message was deleted (act 219). For example, cursor 109 can determine the sequence number for message 101 (e.g., from a LockID). Cursor 109 records in data store 131 that the sequence number for message 101 is deleted. Cursor 109 then sends a TRUE/FALSE to message consumer 197 to indicate if recording to data store 131 was successful.

Method 200 includes an act of the message consumer receiving an indication the cursor successfully updated durable storage (act 220). For example, message consumer 197 can receive a TRUE from cursor 109 (via request/reply channel 139, delivery channel 138, receive channel 137) indicating successful recording in durable store 131 and that message consumer 197 should commit transaction 136. On the other hand, message consumer 197 can receive a FALSE from cursor 109 (via request/reply channel 139, delivery channel 138, receive channel 137) indicating that something failed, such as, for example, a lock expired, message 101 was freed and another message consumer processed message 101 and deleted message 101. In response to a FALSE, message consumer 197 can abort transaction 136

Method 200 includes an act of the message consumer unblocking the delete transaction in response to receiving an outcome indication from the cursor (act 221). For example, message consumer 197 can unblock transaction 136 in response to receiving A TRUE/FALSE from cursor 109. Receiving a TRUE/FALSE causes m.context.Complete( ) to return and permits execution to continue at scope.Complete( ) and thus transaction 136 can also continue.

Method 200 includes an act of the cursor and the consumer durable message store participating in the delete transaction to update durable storage at the cursor (act 222). For example, durable resource manager 141 and cursor 109 can participate in transaction 136 to indicate deletion of message 101 at data store 131. Transaction 136 can be a two-phase commit, include atomic properties, etc. At the completion of transaction 136, message 101 is indicated as deleted in data store 131 and may also be stored in durable resource manager 141 for further processing.

After a message is deleted, cursor 109 can acknowledge receipt of the message. Acknowledgements can be acknowledgement ranges that acknowledge receipt of a range of messages, such as, for example, up to a specified (e.g., incrementally increasing) sequence number. Cursor 109 can schedule a range acknowledgement to be sent at specified times, after a specified number of messages is deleted, etc. For example, cursor 109 can send a range acknowledgment after every tenth message is processed, such as, AckRange(10), AckRange(20), etc.

Since an acknowledgement range is inclusion of all previously deleted messages, a message log's failure to receive an acknowledge is relatively easy to overcome. For example, failure to receive AckRange(10) may cause a message log to retain messages past the time they may still be requested. However, if the cursor subsequently receives AckRange(20), the message log can then delete all messages with sequence numbers less than 20 (and thus including all messages with sequence numbers less than 10).

Embodiments of the present inventions can be efficiently scaled to large number of message consumers. Since a cursor can be collocated with its corresponding message consumer, resources under the control of the message consumer can be allocated to a cursor to maintain state for the message consumer. Thus, a message log is relieved from having to maintain state for message consumers and its resources are freed up for other purposes. As such, these freed up resources can be utilized to transfer a higher volume of messages. Accordingly, queuing and publish/subscribe ("pub/sub") message patterns can be implemented on larger scale.

Figure 3A:
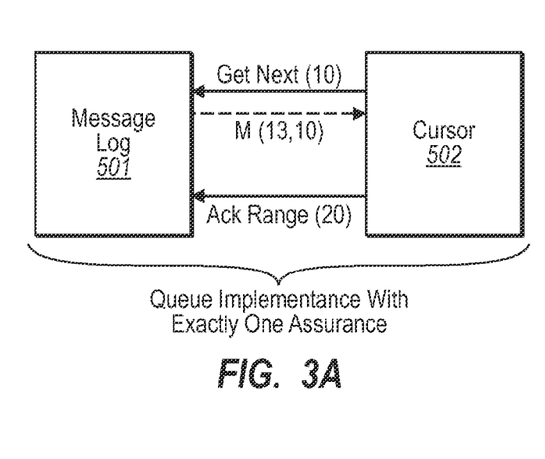
FIGS. 3A-3C depict various architectures for implementing embodiments of the present invention.

FIG. 3A depicts a messaging queue environment with one message and one cursor. In FIG. 3A, cursor 502 requests messages from message log 501. In response to message requests message log 501 returns the next available message based on sequence number. For example, cursor 502 can request the next message after message 10. In response, message log 501 can return message 13. When cursor 502 has dealt with messages up to sequence number 20, cursor 502 can acknowledge processing of all messages in a range of sequence numbers up to 20.

Figure 3B:
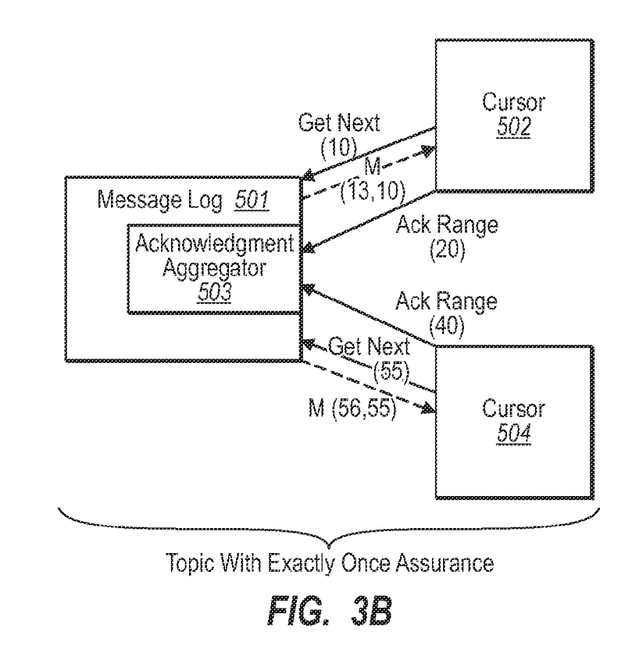

FIG. 3B depicts a message topic (e.g., publish/subscribe) environment with one message log, acknowledgement aggregator and a plurality of cursors. In FIG. 3B, cursor 502 and cursor 504 interact with message log 501 similar to the functionality described in FIG. 3A to request and receive messages. Each cursor uses range acknowledgements to indicate sequence numbers that it is unlikely to (or will never) request again. For example, cursor 502 can send AckRange(20) to indicate that is it is unlikely to request messages with a sequence number lower than 20. Likewise, cursor 504 can send AckRange(40) to indicate that is it is unlikely to request messages with a sequence number lower than 40.

Acknowledgment aggregator 503 can aggregate acknowledgements from a plurality of cursors and, based on aggregated acknowledgments, determine a resulting range of sequence numbers is not likely (or will never) be requested by any of the plurality of cursors. For example, based on received AckRange(20) and AckRange(40), acknowledgment aggregator 503 can determine that sequences numbers less than 20 are not likely to (or will never) be requested again from cursor 502 or cursor 504.

Figure 3C:
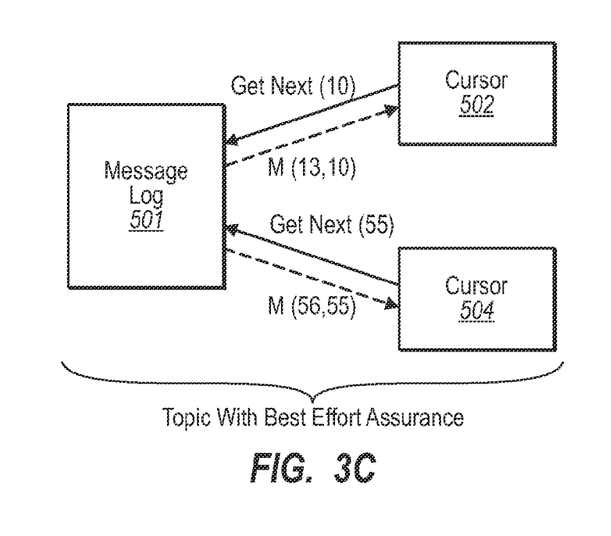

FIG. 3C depicts a message topic (e.g., publish/subscribe) environment with one message log, and a plurality of cursors. Each of the cursors individually requests messages from message log 501. For example, cursor 502 can request the next message after message 10. In response, message log 501 can return message 13. Similarly, cursor 502 can request the next message after message 55. In response, message log 501 can return message 56. No acknowledgments are utilized, resulting in at most once delivery from a message producer to message consumers.

Further since a cursor can be collocated with its corresponding message consumer, transactions can be confined to the same machine or at least to local area networks. That is, a message log is essentially relieved from having to participate in a distributed transaction with its corresponding message consumer over a Wide Area Network, such as, for example, the Internet. Thus, the resource burden for implementing message delivery transactions is reduced at a message producer (and potentially entirely eliminated). Further, since cursor and message consumer are collocated, message delivery transactions create minimal wide area network traffic.

Figure 4:
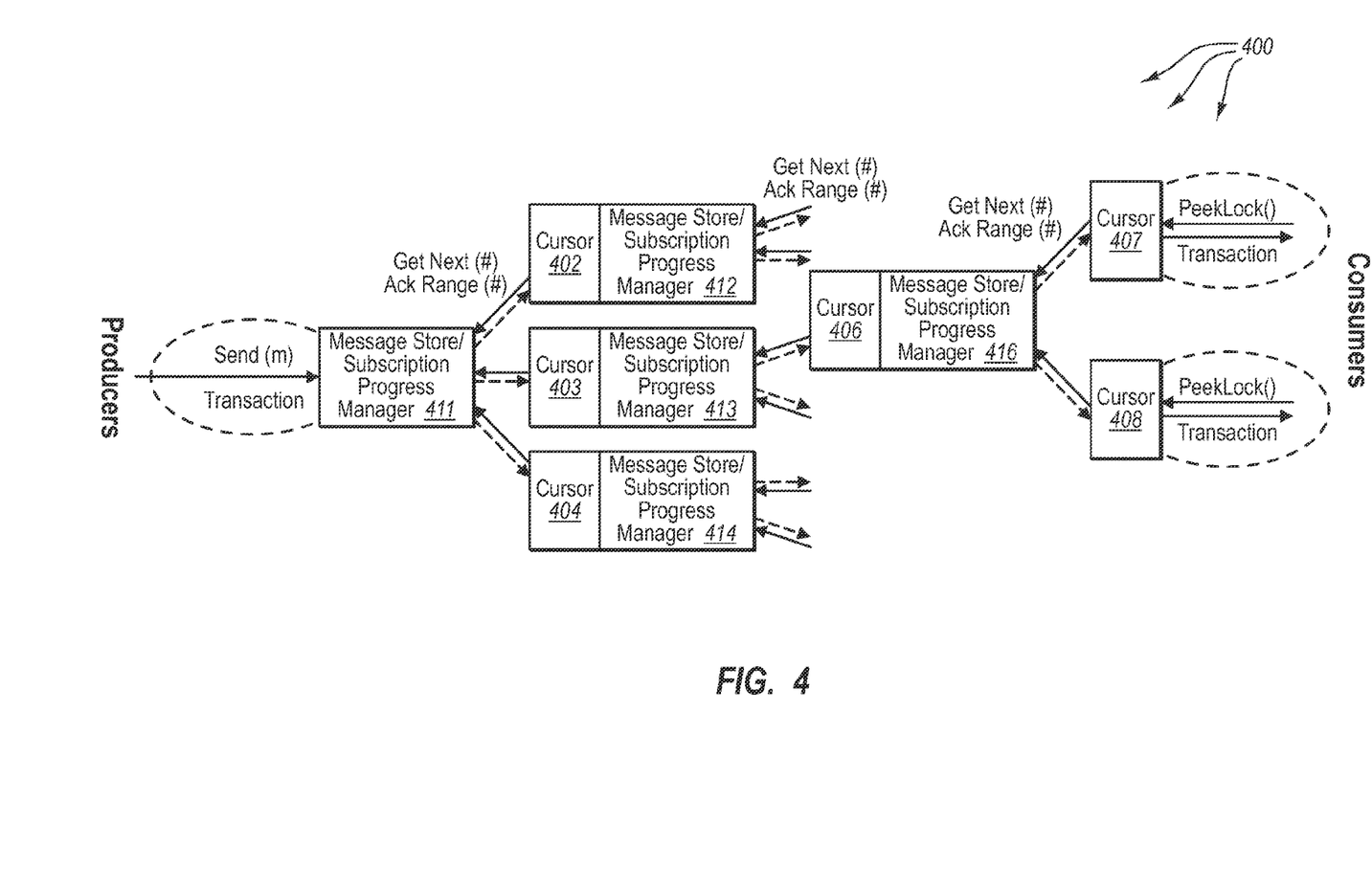
FIG. 4 illustrates a further example computer architecture that facilitates durable exactly once message delivery at scale.

In some embodiments, a message consumer is a further message store/subscription progress manager. These embodiments facilitate larger scale message delivery architectures. For example, FIG. 4 depicts a computer architecture 400 that facilitates durable exactly once message delivery at scale. As depicted in computer architecture 400, producers send messages to message store/subscription progress manager 411. Cursors 402, 403, 404 request and acknowledge messages from message store/subscription progress manager 411. Cursors 402, 403, 404 also maintain message state for message store/subscription progress managers 412, 413, 414 (that can be viewed essentially as message consumers from the perspective of cursors 402, 403, 404) respectively.

One or more further cursors can request and acknowledge messages from each of message store/subscription progress managers 412, 413, 414. For example, cursor 406 can request and acknowledge messages from message store/subscription progress manager 413. Cursor 406 can also maintain message state for message store/subscription progress managers 416.

One or more additional cursors can request and acknowledge messages from message store/subscription progress managers 416. For example, cursors 407 and 408 can request and acknowledge messages from message store/subscription progress manager 416. Cursors 407 and 408 also maintain message state for message consumers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A componentized messaging system providing end to end durable exactly once message delivery, the componentized messaging system comprising:
    a message capture system, including:
        a message producer;
        a capture side durable resource manager;
        a capture side transaction coordinator
        a message log;
        wherein the message producer is configured to initiate a capture transaction for transferring a message to the message log, including:
            synchronously sending a capture transaction ID to the message log; and
            instructing the capture side durable resource manager and the message log to contact a sending side transaction coordinator to enlist in a transaction corresponding to the capture transaction ID, a transaction for coordinating the updates to a sending-side durable resource manager and the capture of the message to the message log; and
        wherein the message log is configured to participate in the transaction for coordinating the updates to the sending-side durable resource manager and capture of a message to the message log, including:
            synchronously receiving the capture transaction ID from the message producer;
            enlisting in the transaction corresponding to the capture transaction ID at the sending side transaction coordinator, the transaction for coordinating the updates in the sending side durable resource manager and capture of the message to the message log;
            receiving the message;
            storing the message in durable storage at the message log; and
            receiving a subsequent indication from the transaction coordinator as to whether to commit or rollback the storing of the message in the durable store
    a message delivery system, including:
        a message consumer;
        a delivery side durable resource manager;
        a delivery side transaction coordinator
        a cursor;

wherein the message consumer is configured to initiate a delivery transaction for transferring the message to the message consumer, including:
  receiving the message from the cursor;
  creating a transaction to atomically coordinate updates to the delivery side durable resource manager and the cursor;
  instructing the delivery side durable resource manager to contact a receiving side transaction coordinator to enlist in the transaction corresponding to a delivery transaction ID;
  processing the message to produce updates to the delivery side durable resource manager;
  synchronously sending a delete request with the delivery transaction ID to the cursor; and
  instructing the cursor to contact the receiving side transaction coordinator to enlist in the transaction corresponding to the delivery transaction ID, a transaction for completing the transaction to atomically coordinate a message delete from the cursor and the message processing update to the delivery side durable resource manager;
wherein the cursor is configured to participate in a transaction for transferring a message from the cursor to the message consumer, including:
  synchronously receiving the delivery transaction ID from the message consumer;
  enlisting in the transaction corresponding to the delivery transaction ID at the delivery side transaction coordinator, the transaction for atomically coordinating the message delete from the cursor and the message processing update to the delivery side durable resource manager; and
  receiving an outcome notification from the delivery side transaction coordinator indicating whether to commit the delete of the message or rollback the delete of the message; and
a network;
wherein the message log and the cursor participate in a transfer protocol across the network to transfer the message from the message log to the cursor, the transfer protocol providing at least once message assurance, the transfer protocol including:
  the message log sending the message to the cursor over the network;
  the message log starting a timer for the message;
  the message log resending the message if the message log fails to receive an acknowledgment of the message receipt from the cursor prior to expiration of the timer;
  the cursor receiving the message;
  the cursor sending an acknowledgement to the message log, the acknowledgement acknowledging receipt of the message; and
  the message log deleting the message in response to the acknowledgement.

2. The componentized messaging system of claim 1, wherein the message producer, the capture side durable resource manager, the capture side transaction coordinator, and the message log are all contained in a first computer system.

3. The componentized messaging system of claim 2, wherein the message consumer, the delivery side durable resource manager, the delivery side transaction coordinator, and the cursor are all contained in a second different computer system such that the network separates the message log and the cursor from one another.

4. The componentized messaging system of claim 1, wherein the message producer synchronously sending a capture transaction ID to the message log comprises sending the capture transaction ID to the message log on a synchronous capture channel and blocking the transaction until the message log acknowledges enlistment in the transaction via the synchronous capture channel.

5. The componentized messaging system of claim 1, wherein the message recipient synchronously sending a delivery transaction ID to the cursor comprises sending the delivery transaction ID to the cursor on a synchronous delivery channel and blocking the transaction until the cursor acknowledges enlistment in the transaction via the synchronous delivery channel.

6. The componentized messaging system of claim 1, wherein the componentized messaging system is configured to implement one of a queued message pattern and a publish-subscribe messaging pattern.

7. A componentized messaging system, the componentized messaging system including a producer durable message store, a message producer, a message log, a network, a cursor, a message consumer, and a consumer durable message store, the cursor configured to store durable state and delete duplicate messages to implement an at most once messaging behavior, a method for providing end to end durable exactly once message delivery, the method comprising:
  an act of the message producer transferring a message to the message log using a capture protocol that assures durable exactly once transfer of the message from the message producer to the message log, the capture protocol including:
    an act of the message producer sending a transaction ID to the message log, the transaction ID identifying a capture transaction that is to be used to transfer the message to the message log, the message producer blocking the capture transaction until it is indicated that the message log is enlisted in a capture transaction;
    an act of the message log receiving the transaction ID from the message producer;
    an act of the message log enlisting with a transaction coordinator to participate in the capture transaction;
    an act of the message log sending an enlisted indicator to the message producer to indicate to the message producer that the message log is enlisted in the capture transaction;
    an act of the message producer receiving the enlisted indicator from the message log;
    an act of the message producer unblocking the capture transaction in response to receiving the enlisted indicator from the message log; and
    an act of the message log and the producer durable message store participating in the capture transaction to atomically coordinate the capture of the message to durable storage at the message log and updates to the durable resource manager;
  an act of the message log sending the message to the cursor over the network using a transfer protocol that assures at least once transfer of the message from the message log to the cursor, use of the transfer protocol in combination with the at most once messaging behavior of a receiving component resulting in exactly once transfer of the message from the message log to the cursor;
  an act of the cursor receiving the message from the message log over the network using the transfer protocol;
  an act of the cursor storing the message in durable storage at the cursor;

an act of the cursor transferring the message to the message consumer using a delivery protocol that assures durable exactly once transfer of the message from the cursor to the message consumer, the delivery protocol including:
- an act of the cursor sending a receive context of the message to the message consumer;
- an act of the message consumer receiving the receive context of the message from the cursor;
- an act of the message consumer formulating a transaction ID identifying a delivery transaction that is to be used to transfer the message to the message consumer, the message consumer blocking the delivery transaction until it is indicated that the cursor is enlisted in the delivery transaction;
- an act of the message consumer sending the transaction ID to the cursor;
- an act of the cursor receiving the transaction ID from the message consumer;
- an act of the cursor enlisting with a transaction coordinator to participate in the delivery transaction;
- an act of the cursor sending an enlisted indicator to the message consumer to indicate to the message producer that the message log is enlisted in the delivery transaction;
- an act of the message consumer receiving the enlisted indicator from the cursor;
- an act of the message consumer unblocking the delivery transaction in response to receiving the enlisted indicator from the cursor; and
- an act of the cursor and the consumer durable message store participating in the delivery transaction to transfer the message from durable storage at the cursor to the consumer durable message store.

8. A componentized messaging system providing end to end durable exactly once message delivery, the componentized messaging system comprising:
- a message capture system, including:
  - a message producer;
  - a capture side durable resource manager;
  - a capture side transaction coordinator
  - a message log;
  - wherein the message producer is configured to initiate a capture transaction for transferring a message to the message log, including:
    - synchronously sending a capture transaction ID to the message log; and
    - instructing the capture side durable resource manager and the message log to contact a sending side transaction coordinator to enlist in a transaction corresponding to the capture transaction ID, a transaction for coordinating the updates to a sending-side durable resource manager and the capture of the message to the message log; and
  - wherein the message log is configured to participate in the transaction for coordinating the updates to the sending-side durable resource manager and capture of a message to the message log, including:
    - synchronously receiving the capture transaction ID from the message producer;
    - enlisting in the transaction corresponding to the capture transaction ID at the sending side transaction coordinator, the transaction for coordinating the updates in the sending side durable resource manager and capture of the message to the message log;
    - receiving the message;
    - storing the message in durable storage at the message log; and
    - receiving a subsequent indication from the transaction coordinator as to whether to commit or rollback the storing of the message in the durable store
- a message delivery system, including:
  - a message consumer;
  - a delivery side durable resource manager;
  - a delivery side transaction coordinator
  - a cursor;
  - wherein the message consumer is configured to initiate a delivery transaction for transferring the message to the message consumer, including:
    - receiving the message from the cursor;
    - creating a transaction to atomically coordinate updates to the delivery side durable resource manager and the cursor;
    - instructing the delivery side durable resource manager to contact a receiving side transaction coordinator to enlist in the transaction corresponding to a delivery transaction ID;
    - processing the message to produce updates to the delivery side durable resource manager;
    - synchronously sending a delete request with the delivery transaction ID to the cursor; and
    - instructing the cursor to contact the receiving side transaction coordinator to enlist in the transaction corresponding to the delivery transaction ID, a transaction for completing the transaction to atomically coordinate a message delete from the cursor and the message processing update to the delivery side durable resource manager;
  - wherein the cursor is configured to participate in a transaction for transferring a message from the cursor to the message consumer, including:
    - synchronously receiving the delivery transaction ID from the message consumer;
    - enlisting in the transaction corresponding to the delivery transaction ID at the delivery side transaction coordinator, the transaction for atomically coordinating the message delete from the cursor and the message processing update to the delivery side durable resource manager; and
    - receiving an outcome notification from the delivery side transaction coordinator indicating whether to commit the delete of the message or rollback the delete of the message; and
- a network;
- wherein the message log and the cursor participate in a transfer protocol across the network to transfer the message from the message log to the cursor, the transfer protocol providing at least once message assurance.

9. The componentized messaging system of claim 8, wherein the message producer comprises one of a queue and a publish-subscribe messaging environment.

10. The componentized messaging system of claim 8, wherein the message log comprises one of a queue and a publish-subscribe messaging environment.

11. The componentized messaging system of claim 8, wherein the cursor comprises one of a queue and a publish-subscribe messaging environment.

* * * * *